Sept. 15, 1931.  K. P. BILLNER  1,823,343
METHOD OF PRODUCING POROUS CONCRETE
Filed Feb. 26, 1930   2 Sheets-Sheet 1
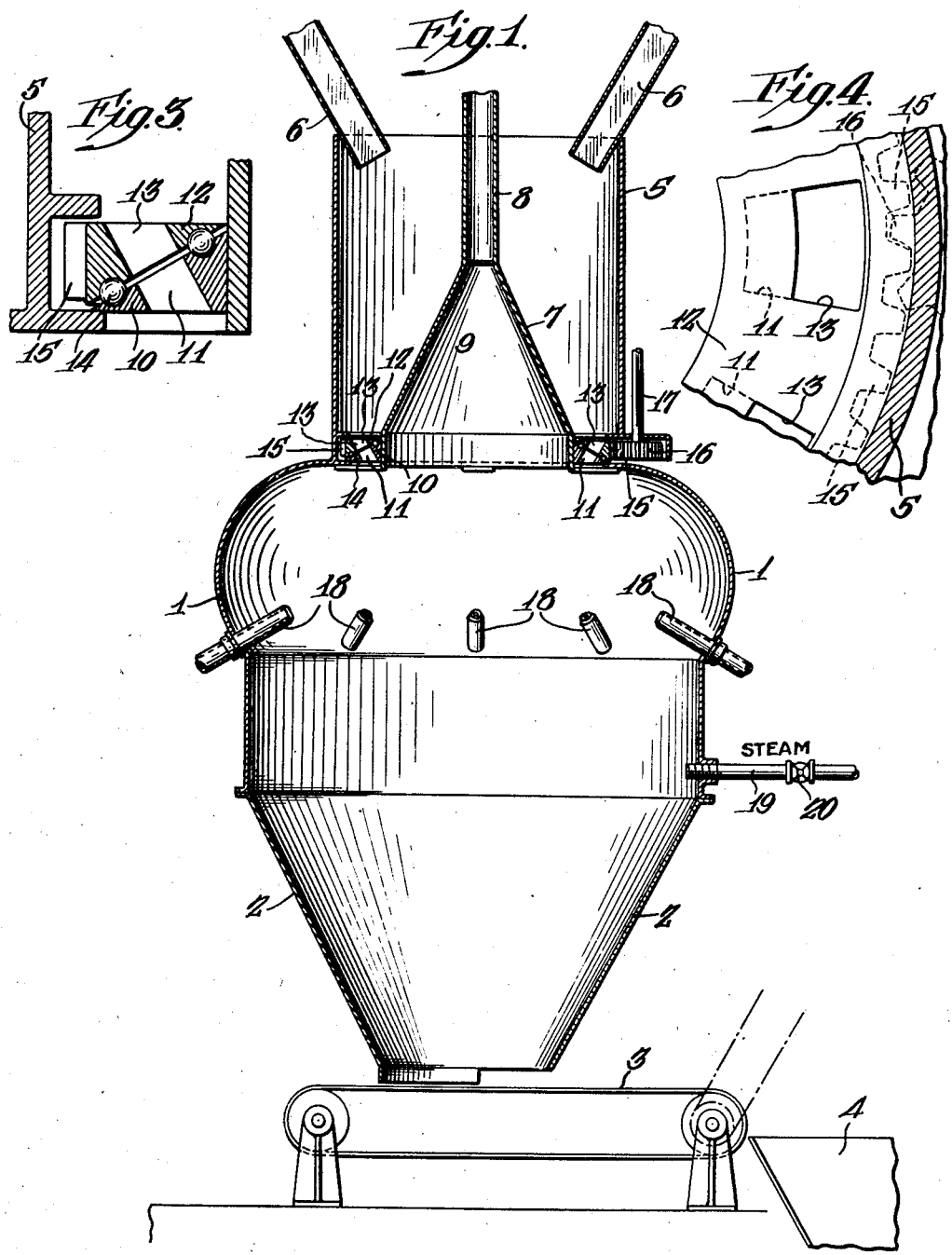

Sept. 15, 1931.   K. P. BILLNER   1,823,343
METHOD OF PRODUCING POROUS CONCRETE
Filed Feb. 26, 1930   2 Sheets-Sheet 2
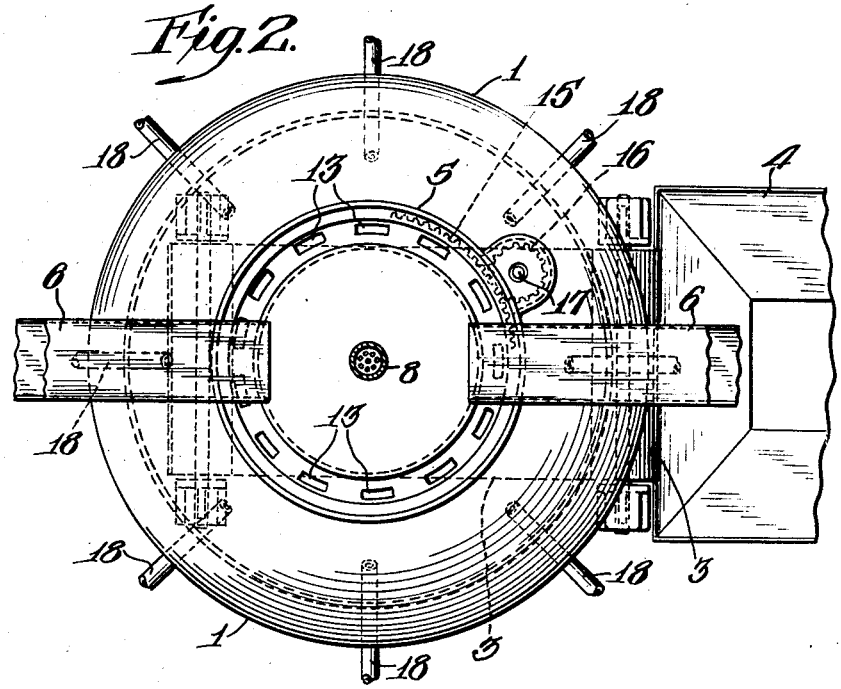
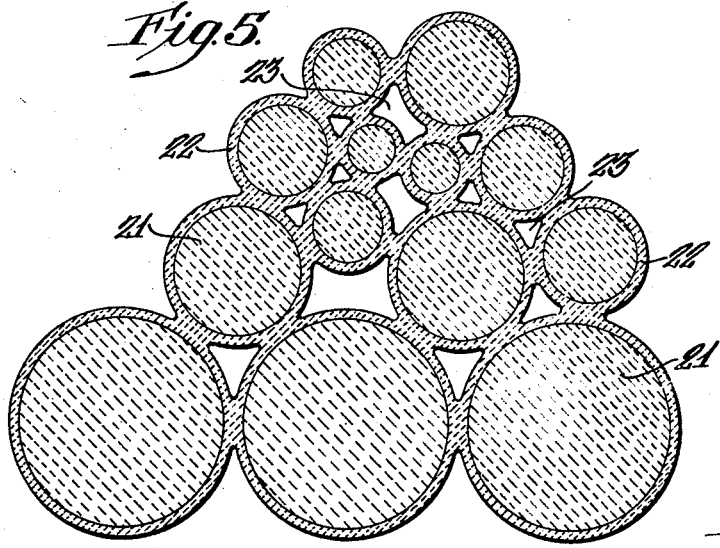

Patented Sept. 15, 1931

1,823,343

UNITED STATES PATENT OFFICE

KARL P. BILLNER, OF NEW YORK, N. Y., ASSIGNOR TO THE AEROCRETE CORPORATION OF AMERICA, OF NEW YORK, N. Y., A CORPORATION OF DELAWARE

METHOD OF PRODUCING POROUS CONCRETE

Application filed February 26, 1930. Serial No. 431,373.

My present invention relates to an improved method of producing porous concrete.

My improved porous concrete produced by the method herein claimed comprises a suitable aggregate, the separate particles of which are covered with cement (preferably Portland cement) whereby the particles will be bonded together by reason of the setting of the cement coatings, thus forming a multiplicity of air spaces throughout the mass. The coating of cement applied to the individual particles of the aggregate may vary in thickness from a film of say one millimeter to a layer of substantial depth. By using relatively thick coatings a mechanically strong concrete can be secured and this is especially the case when the aggregate used is a heavy material, such as crushed stone.

When a very light porous cement is desired, I employ an aggregate material of low specific gravity, such as granulated blast furnace slag, cinders, volcanic ashes, diatomaceous earth, expanded clay or so-called haydite, or other infusible material of light weight.

In the manufacture of a very light porous cement, I prefer to use granulated blast furnace slag, that is to say the product secured by rapidly cooling by means of water or steam, the molten slag drawn off from blast furnaces. As a result of this treatment, the slag is broken or cracked into pieces of varying size and shape. This particular material is very light and cheap and possesses other properties which are especially desirable in the makeup of porous concrete.

With this material, I have been able to successfully manufacture porous concrete having a density as low as 20 lbs. per cubic foot.

My improved porous concrete is soundproof and fire-proof in a high degree, and is therefore well adapted for use as a building material for floors and partitions.

It may be formed into separate blocks, which will be used in the same way as hollow tiles, or it may be cast in situ.

My improved method of making porous concrete consists in permitting the aggregate material to be moved in space preferably by gravity in the form of a substantially continuous stream or sheet, and in subjecting the moving particles to the effect of a blast or stream or a plurality of blasts or streams of cement by which the individual particles will receive a coating of cement entirely covering the same. The thickness of such a coating will depend upon the character or volume of the stream or blast to which the several particles will be subjected and also the time during which the several particles are subjected thereto.

When the aggregate material is of a porous nature, such as granulated blast furnace slag, it is preferable that it should be thoroughly saturated with water, so as to fill the pores thereof and in such case I prefer to apply the cement as a dry powder blown into contact with the moving wet particles by one or more blasts of air. In this way, the water will be derived from the particles themselves.

When the aggregate material is of a heavy non-porous nature, the cement may be first mixed with water to form a slurry which will be directed into contact with the moving particles so as to coat the same to the desired thickness. Obviously, the cement in the form of one or more streams of slurry may be applied to the particles which are of a porous nature, although when the aggregate is of this character, I prefer to apply the dry cement by means of an air blast. Should additional moisture be required to effect the adhesion of the cement to the moving particles, whether of porous or non-porous nature, an atmosphere of wet steam may be maintained within the chamber in which the coating takes place.

In order that my invention may be better understood, attention is directed to the accompanying drawings, forming part of this specification and in which Figure 1 is a vertical sectional view partly in elevation showing an illustrative apparatus intended for the carrying out of my improved method.

Figure 2 is a plan view of the apparatus shown in Figure 1.

Figure 3 is a sectional view on an enlarged scale showing the arrangement of feeding device.

Figure 4 is a sectional view at right angles to Figure 3, showing the same elements and in addition a portion of the driving pinion and Figure 5, a cross sectional view showing the porous character of my improved product, and in which the conditions are idealized, the aggregates being illustrated as spheres when as a matter of fact in practice they will be irregular. In all of the above views corresponding parts are represented by the same characters.

Referring first to the apparatus, it comprises an enclosed chamber 1, made preferably of sheet metal having a tapered or hopper-like lower end 2. Below the chamber is a belt or conveyor 3 for carrying off the product before the same has set and directing the same to a chute 4, from which it will be taken to the molds, forms, or other place in which setting occurs.

Projecting above the upper end of the apparatus chamber 1, is a cylindrical extension 5, into which the aggregate material will be directed by one or more chutes 6. Within the extension 5 is an inverted hopper 7 from which leads a pipe 8 to the atmosphere and through which air from the interior of the chamber may escape. Screen 9 may be used to prevent the escape of the cement through the air pipe 8.

In order to evenly distribute the aggregate material and cause the same to fall as a practically continuous cylindrical sheet through the chamber 1, I may employ a stationary ring 10 having a series of openings 11 therein, and with which cooperates a rotating ring 12 having a similar series of openings 13 therein as shown in Figures 3 and 4. Anti-friction balls 14 may be imposed between the two rings. The ring 13 may be operated in any suitable way such as by means of teeth 15 with which meshes a gear 16 on shaft 17.

In the chamber 1 and projecting radially therein are the nozzles 18 pointing slightly upwards. By means of these nozzles cement in dry form may be blown by means of air blasts or instead thereof streams of slurry may be forced by pressure in any suitable way. A steam pipe 19 having control valve 20 may be made use of to supply an atmosphere of wet steam within the chamber, either for the purpose of augmenting the moisture content or for supplying moisture to the falling particles of aggregate.

With an apparatus such as I have described, I carry out my improved method as follows:

A suitable aggregate material preferably granulated blast furnace slag is supplied in the proper amount to the extension 5 and accumulates therein in the space between said extension and the inverted hopper 7. The size of the particles of aggregate is unimportant, but preferably the particles should not be larger than two inches in diameter. In some instances it may be desirable to screen aggregate material so as to remove very small particles, for the reason that it is desirable that the particles should be large enough to form well defined air spaces in the mass between the cement coatings and adjacent particles. If very small particles are used, the coatings therein would coalesce with adjacent coatings to fill up the spaces between the particles and thus prevent the formation of desirable pores.

When the aggregate used is of a porous nature, such as granulated blast furnace slag, it is preferably saturated with water before being introduced into the extension 5 so as to fill all the pores thereof. If, however, the aggregate is a heavy non-porous material, such as crushed stone, it may be fed dry. Power being applied to the shaft 17, the ring 10 will be slowly turned permitting the material to fall through openings 11 and 13 when they coincide and drop by gravity through the chamber 1 into the hopper-like bottom 2. As the falling particles drop past the nozzles 18 they will be subjected to the effect of blasts or streams of cement so as to be coated uniformly thereby.

By adjusting the angle of the nozzles 18, the velocity of the falling particles may be retarded more or less so as thereby to vary the thickness of the coatings supplied by the particles. This thickness of coating will also depend upon the amount of cement supplied by the nozzles.

When the aggregate is of a porous nature, such as blast furnace slag, the cement is applied preferably in dry form through the agency of air blast. If, however, the aggregate is non-porous and especially when it is dry, the cement may be forced through the nozzles as streams of slurry, thus not only applying the cement to the particles, but furnishing the water necessary for setting.

If desired, an atmosphere of wet steam may be introduced into the chamber through the steam pipe 19. The moisture furnished in this way may be in addition to that due to preliminary saturation, or may be relied upon entirely to furnish the water needed for the purpose. That is to say, the steam pipe 19 may supply an atmosphere of wet steam through which the dry-material may fall, either porous or non-porous, the falling particles being then subjected to the action of dry cement forced by air blasts into the chamber through the nozzles 18. The particles which have thus been coated with the cement fall upon the conveyor 3 and are carried off to the place of use where setting takes place.

As shown in Figure 5, the particles 21 of varying size are each coated with a layer 22 of cement, so that when the particles come together these coatings will evenutally coalesce and set to form air spaces 23 of varying size throughout the mass. As I have indicated, when a porous aggregate is used of the nature of granulated furnace slag, it is possible to make a porous cement of this character weighing in the neighborhood of 20 lbs. per cubic foot.

By making the coatings of substantial thickness a very strong but heavier porous cement will be obtained. And additional strength will be secured by using non-porous aggregate, such as crushed stone, although at a sacrifice of lightness.

My improved porous cement can be made very cheaply in the way I have described and it is sound-proof and fire-proof in a very high degree.

Having now described my invention, what I claim as new therein, and desire to secure by Letters Patent, is as follows:

1. The method of making porous concrete, which consists in moving particles of aggregate material to which moisture has been applied with respect to a nozzle, and blowing dry cement into contact with the particles to coat the same and collecting the coated particles, whereby adjacent coatings will coalesce to form air spaces or pockets throughout the mass.

2. The method of making porous concrete which consists in first saturating a porous aggregate material with water, then in moving the particles with respect to a nozzle through which dry cement is directed against the moving particles to coat the same, and accumulating the coated particles whereby the adjacent coatings coalesce to form air spaces or pockets throughout the mass.

3. The method of making porous concrete which consists in feeding by gravity a sheet or blanket of aggregate material with respect to an air blast blowing cement upon the particles to coat the same, the blast being directed upwards so as to retard the falling particles and accumulating the coated particles, whereby adjacent coatings will coalesce to form air spaces or pockets throughout the mass.

4. The method of making porous concrete which consists in saturating a porous aggregate material with water, then in feeding the same by gravity with respect to an air blast by which dry cement will be caused to coat the individual particles and in accumulating the coated particles whereby adjacent coatings will coalesce to form air spaces or pockets throughout the mass.

KARL P. BILLNER.